UNITED STATES PATENT OFFICE.

ERWIN E. A. G. MEYER, OF DETROIT, MICHIGAN, ASSIGNOR TO MORGAN & WRIGHT, A CORPORATION OF MICHIGAN.

RUBBER COMPOUND AND THE METHOD OF MAKING SAME.

1,242,886.  Specification of Letters Patent.  Patented Oct. 9, 1917.

No Drawing.  Application filed March 7, 1914. Serial No. 823,181.

*To all whom it may concern:*

Be it known that I, ERWIN E. A. G. MEYER, a subject of the Emperor of Germany, and a resident of Detroit, county of Wayne, and State of Michigan, have invented certain new and useful Improvements in Rubber Compounds and the Methods of Making Same, of which the following is a full, clear, and exact description.

This invention relates to rubber compounds and the method of making same, and more particularly to a compound including therein high grade rubber.

By my invention I am enabled to produce a rubber compound, the base of which is a high grade stiff rubber, such as Ceylon or Pará rubbers, which compound will possess properties imparting thereto after vulcanization, inherent characteristics and a finish which are commonly found only in softer rubbers such as Guayule and some African rubbers, while retaining the superior quality of the base. I have found that while the base of this compound is a high grade, stiff rubber, the other ingredients or agents, compounded therewith, will not only modify the natural properties of this rubber, but will combine therewith, in a manner and in such proportion as to enable me to produce this compound at a cost to adapt it for use in commercial competition with the cheaper natural products.

To secure the desired result, I have found it necessary to combine the rubber and other ingredients in a particular manner, in order to enable me to incorporate in the compound a sufficient quantity or volume of the modifying or softening agent.

My invention consists in a rubber compound embodying therein an admixture of a high grade stiff rubber and an unctuous softening agent, in such proportions as to impart to the compound, after vulcanization, softness, a high degree of elasticity and smoothness of finish; and in other novel characteristics, and the novel method of combining the rubber and the softening agent, all as hereinafter set forth and described and more particularly pointed out in the claims hereto appended.

A rubber compound such as that contemplated by my invention is especially adapted for use in the production of inner tubes of vehicle tires and for other articles in which softness of texture, high elasticity and smoothness of finish are essential, or desirable, characteristics.

At the present time articles of this character are sometimes made from relatively low grade rubbers, such as Guayule and soft African rubbers, the peculiar properties of which are imparted thereto by natural ingredients such as resins. At the present time the available supply of such rubbers is limited, and it is therefore highly desirable to secure a satisfactory substitute therefor.

While naturally, high grade stiff rubber, such as Ceylon or Pará rubbers, are unsuited for use in the production of articles of this character, because of the absence of natural ingredients imparting thereto the necessary softness, I am enabled, by mixing therewith certain modifying or softening agents, to produce a compound dissimilar from Guayule or soft African rubbers, but possessing those properties which will adapt it to the same uses as these natural products. At the same time, my compound is superior in uniformity and various other important characteristics to the natural rubbers.

By mixing with a high grade stiff rubber, such as Ceylon or Para rubber, an unctuous substance, such as petrolatum, in such proportions as to impart to the rubber base the desired degree of softness, I am enabled to secure a product which, upon vulcanization, will possess the desired degree of elasticity and have a smooth, velvety finish; and one which if placed under continuous stretch, will not take a high permanent set. I have found that a composition in which about five parts of rubber to four parts of the petrolatum or softening agent, are used, give highly satisfactory results and that the proportion of the petrolatum may be reduced to fifteen parts of petrolatum to one hundred parts of rubber without any substantial loss in the quality of the product. I contemplate the addition of a substance to quicken the cure of the compound, such as anilin oil, and find that the use of three parts of such oil to one hundred parts of rubber and eighty parts of petrolatum, give satisfactory results.

The proportions of rubber and the softening agent, or of the agent for quickening the curing of the compound, may be varied according to the desired quality of the product. For instance, a compound composed of a smaller proportion of petrolatum and anilin will give a very excellent product which will stand up well under the ordinary conditions of use in such articles as inner tubes for vehicle tires.

In the compounding of this rubber compound, various expedients have been practised, such as milling the crude rubber and the petrolatum in the usual manner, but it has been found that ordinary mixing conditions do not combine the ingredients in a manner to secure the desired results. I have discovered, however, that if after mixing the ingredients mechanically in any desired manner, the mixture is subjected to the action of heat of a temperature above that of the melting point of the softening agent, as by subjecting the mixture to steam, there is a more thorough blending of the rubber and unctuous material to form a homogeneous mixture and the compound when vulcanized, will have the desired characteristics. If the vulcanizing medium be mixed with the compound at the same time as the softening agents, care must be taken that the temperature to which the batch is subjected, does not reach the vulcanizing degree, but the time or manner of mixing in the vulcanizing medium, or the loading material, when such is used, is non-essential to my invention, and such may be incorporated in the mixture at any time prior to the vulcanization thereof. I have found the heating of the mixture after, or during the incorporation therein of the petrolatum, or other softening agent, to be essential however.

Having described my invention, what I claim as new and desire to have protected by Letters Patent is:

1. A method of making rubber compounds consisting in mixing high grade stiff anilin rubber and an unctuous softening agent in such proportions as to impart to the compound, after vulcanization, softness, a high degree of elasticity and smoothness of texture and subjecting the mixture to the action of heat at a temperature to permit thorough penetration of the softening agent to produce a homogeneous material.

2. A method of making rubber compounds, consisting in mechanically mixing high grade stiff rubber, anilin oil and an unctuous softening agent in such proportions as to impart to the compound, after vulcanization, softness, a high degree of elasticity and smoothness of texture, and subjecting the mixture to the action of steam at a temperature to permit thorough penetration of the softening agent to produce a homogeneous material.

3. A method of making rubber compounds consisting in mixing Ceylon rubber, a relatively small amount of anilin oil, and petrolatum in such proportions as to impart to the compound, after vulcanization, softness, a high degree of elasticity and smoothness of texture and subjecting the mixture to the action of heat at a temperature to permit thorough penetration of the petrolatum to produce a homogeneous material.

4. A method of making rubber compounds, consisting in mixing in the presence of open steam Ceylon rubber, a relatively small amount of anilin oil, and petrolatum in such proportions as to impart to the compound, after vulcanization, softness, a high degree of elasticity and smoothness of texture, and thereafter subjecting the mixture to the action of steam at a temperature to permit thorough penetration of the petrolatum to produce a homogeneous material.

Signed at Detroit, county of Wayne and State of Michigan, this 28th day of February, 1914.

ERWIN E. A. G. MEYER.

Witnesses:
J. H. SWIFT,
E. LA BUSCHEWSKY.